Oct. 20, 1931.   R. H. CHILTON   1,828,393

STORAGE BATTERY

Filed Sept. 20, 1928

Inventor
Ralph H. Chilton
By Spencer, Hardman & Fehr
his Attorneys

Patented Oct. 20, 1931

1,828,393

UNITED STATES PATENT OFFICE

RALPH H. CHILTON, OF DAYTON, OHIO, ASSIGNOR TO THE INLAND MANUFACTURING COMPANY, OF DAYTON, OHIO, A CORPORATION OF DELAWARE

STORAGE BATTERY

Application filed September 20, 1928. Serial No. 307,230.

This invention relates to storage batteries such as are adapted for use as starting and lighting batteries on automobiles.

An object of the invention is to provide simple and efficient means for electrically connecting certain battery elements in adjacent cells below the top edge of the partition between said cells, whereby such connecting means does not extend into or through the battery cover. An important feature of this construction is that it readily permits the use of a unitary cover for a plurality of cells and the top surface of the cover presents a neater appearance and tends to remain clean due to the absence of metal connectors projecting from the upper surface of said cover.

Another object is to provide an improved sealed joint between a unitary battery cover and the top edges of the partitions between the cells whereby the sealing material is better retained in place.

Further objects and advantages of the present invention will be apparent from the following description, reference being had to the accompanying drawings, wherein a preferred embodiment of one form of the present invention is clearly shown.

In the drawings.

Similar reference characters refer to similar parts throughout the several drawings.

Figure 1:
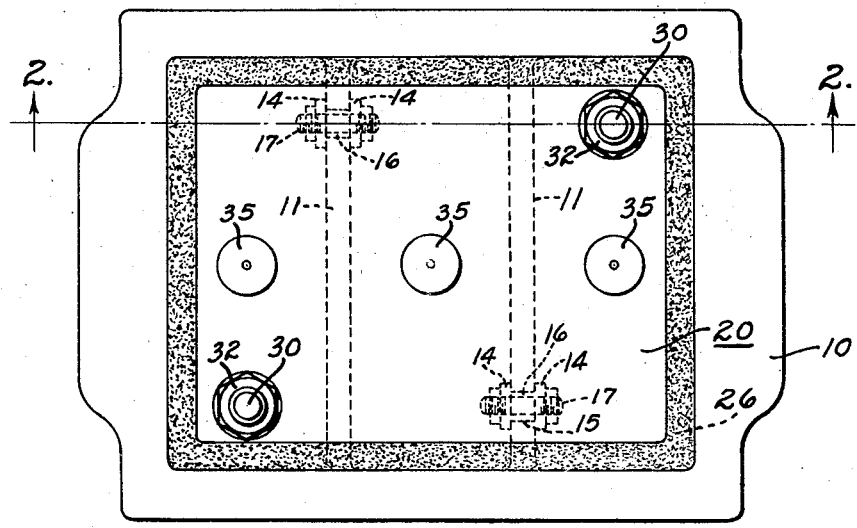
Fig. 1 is a plan view of a three-cell storage battery made according to this invention.
Figure 2:
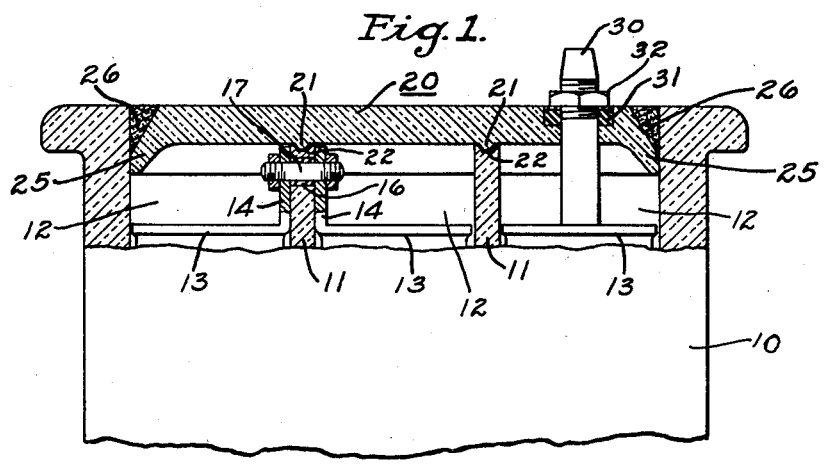
Fig. 2 is a longitudinal section on line 2—2 of Fig. 1.
Figures 3, 4:
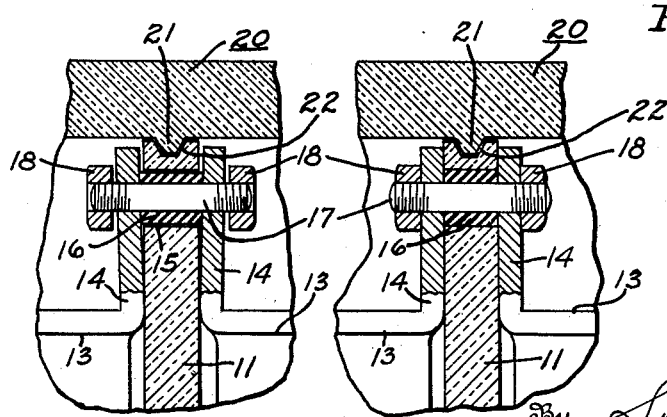
Fig. 3 is a detail of the intercell connection through one of the partitions, and shows the parts in loose or unclamped relationship.
Fig. 4 is a view similar to Fig. 3, but shows the parts tightly clamped together and sealing the hole through the partition to prevent possible leakage around the cross bolt.

The battery container 10 has transverse partitions 11 therein forming three separate cells 12. Each cell 12 has positive and negative battery elements inserted therein in a well known manner and indicated somewhat diagrammatically at 13. 14, 14 designates upstanding preferably flat section posts from the battery elements 13. The partitions 11 are provided with the transverse holes 15, preferably near the upper edges thereof, and an elastic rubber bushing 16 of slightly greater length than the thickness of the partitions is inserted somewhat loosely into each hole 15 (see Fig. 3). The flat section posts 14 are bent to contact with opposite ends of the rubber bushing 16, as shown in Fig. 3, and a threaded bolt or stud 17 is passed through aligned holes in posts 14 and bushing 16 and the nuts 18 applied to the ends of bolt 17. Now when nuts 18 are drawn up tight, the posts 14 are clamped firmly up against opposite sides of the partition 11, causing the rubber bushing 16 to shorten in length and hence to be compressed tightly against the surrounding hole 15 and against the bolt 17, thus giving a perfect seal which will prevent the possibility of leakage of electrolyte between the cells. When the nuts 18 are tightened they will scrape the contacting surfaces of the lead alloy posts 14 and so provide a good electrical contact between these posts 14 and the nuts 18 and bolt 17. If desired, a more permanent electrical connection may be made between these parts by riveting over the ends of the lead alloy bolt 17 or by fusing the nuts 18 to the posts 14 and bolt 17.

By making the desired cross connections between the battery elements in adjacent cells entirely below the top edge of the partitions 11, a unitary cover for all the cells may be readily used to advantage. I have illustrated a unitary cover 20 provided with depending transverse tongues 21 which fit loosely within corresponding grooves 22 cut or molded in the top edges of partitions 11. A suitable sealing compound in a soft plastic state is put into grooves 22 just prior to placing cover 20 upon the container 10. Then when cover 20 is pressed down in position, the tongues 21 thereon will embed themselves in the sealing material in grooves 22 and cause this sealing material to flow up and fill the entire space between the cover and the upper surface of the partitions and give a leak-tight joint between the separate cells.

The edges of cover 20 may be joined and sealed in place to the walls of container 10 in any desired and well known manner. I have shown cover 20 as having a downwardly inclined marginal portion 25 which fits snugly within the side walls of container 10. This provides a triangular section groove 26 which is filled with a suitable sealing compound to seal the joint between the cover and container walls and to retain the cover firmly in place.

The two terminal posts 30 of the battery may project through suitable apertures in cover 20 in any ordinary and well known manner. I have shown the posts 30 passing through holes in cover 20 and the crevice therearound sealed by a small soft rubber bushing 31 which is compressed by the nut 32 threaded upon post 30.

The vented filler plugs 35 cover the filler openings leading into each of the three cells 12.

While the form of embodiment of the present invention as herein disclosed, constitutes a preferred form, it is to be understood that other forms might be adopted, all coming within the scope of the claims which follow.

What is claimed is as follows:

1. A storage battery comprising: a container having a partition therein forming a plurality of cells, battery elements in two adjacent cells each having a post projecting upward adjacent opposite sides of said partition and extending over a hole in said partition, a soft rubber bushing in the hole in said partition and compressed by said opposing posts, and a metal connector extending through said bushing and connected to and clamping said posts against said bushing whereby said bushing is expanded in diameter and seals said hole.

2. A storage battery comprising: a container having a partition therein forming two separate cells, battery elements in said cells each having a post projecting upward adjacent opposite sides of said partition and extending over a hole in said partition, an elastic bushing in said hole, and a metal connector extending through said hole and bushing and clamping said posts together upon opposite ends of said bushing, whereby said bushing is expanded in diameter and caused to seal said hole.

3. A storage battery comprising: a container having a partition therein forming two separate cells, battery elements in said cells each having a post projecting upward adjacent opposite sides of said partition and extending over a hole in said partition, an elastic bushing in said hole, a bolt extending through said bushing and through aligned apertures in said posts, and a nut threaded upon said bolt for clamping said posts against said bushing, whereby said bushing is expanded in diameter and caused to tightly seal the hole in said partition.

4. A storage battery comprising: a container having a partition therein forming two separate cells, said partition having a transverse aperture therein, a rubber bushing in said aperture, battery elements in said cells each having a post contacting with opposite ends of said bushing, a metal connector extending through said hole and bushing and retaining said posts clamped together upon opposite ends of said bushing, whereby said bushing is expanded in diameter and caused to seal said aperture.

In testimony whereof I hereto affix my signature.

RALPH H. CHILTON.